March 17, 1970  A. M. BARON  3,501,171
CONNECTOR ASSEMBLY FOR FLUID CONDUITS
Filed July 10, 1967

INVENTOR
Alfred M. Baron

ATTORNEYS

United States Patent Office 3,501,171
Patented Mar. 17, 1970

3,501,171
CONNECTOR ASSEMBLY FOR FLUID CONDUITS
Alfred Morton Baron, 3063 Patricia Ave.,
Los Angeles, Calif. 90064
Filed July 10, 1967, Ser. No. 652,237
Int. Cl. F16l *19/02, 55/20, 59/16*
U.S. Cl. 285—52                                    5 Claims

ABSTRACT OF THE DISCLOSURE

This application discloses a connector assembly for connecting a fluid conduit to a nipple or the like. The assembly comprises a union nut which has a collar at one end to fit around the conduit with the end of this conduit being reverse flanged. This reverse flange bears upon a reverse seat provided at the inside edge of the collar, the seat preferably being a part of an insulating sleeve which is interposed between the collar and the conduit. A sealing washer having a reverse slanted face is forced against the reverse flange by threading a nipple into the other end of the union nut, the material of the washer being displaced into a recess as the nipple is tightened.

---

In connecting copper tubing of the type now ordinarily used in plumbing to a fitting or nipple, the conventional 45° flare joint is standard. This flare joint consists of a union nut having a 45° seat formed therein, and the conduit is fitted into the union nut and flared at 45° to mate with the seat. A nipple is torqued into the union nut to provide the seal, ordinarily a sealing washer being interposed between the nipple and the 45° flare. In this conventional flare joint, excessive torquing of the nipple into the union nut has a tendency to drive the sealing washer into the through bore, and this of course tends to reduce or choke off the flow of fluid through the connection. Also, any accidental reverse torquing or backing off on the nipple creates excessive leakage, whereas continual excessive torquing will ultimately sever the seat or flange.

It is the principal object of the present invention to provide an assembly for connecting a conduit to a nipple or the like wherein a positive seal is provided and wherein excessive torquing will not tend to either sever the joint or block the through bore or fluid passage, while undertorquing will still produce an effective seal, and further to provide such an assembly wherein reverse torquing will be compensated for by a self-sealing effect. Another object is to provide such a connector assembly wherein an insulating or dielectric sleeve is provided between the conduit and the union.

In accordance with this invention, a connector assembly is provided which comprises a union nut with a collar at one end through which the copper tubing or the like extends. A dielectric sleeve may be interposed between the collar and the tubing, with an enlarged part of the inside end of the sleeve bearing upon the inside face of the collar while a reverse slanting seat is provided on the inner end of the sleeve. A reverse flange on the end of the tubing mates with this reverse seat, and a sealing washer used in the union nut has a reverse-slanted face which engages the reverse flange of the tubing. The end of the union nut opposite the collar is of course threaded or otherwise adapted to engage a nipple or the like. Upon torquing of the nipple into the union nut the sealing washer is displaced toward the reverse flange to produce an effective seal even though the union nut and nipple may be torqued only hand-tight. With additional torquing, the material of the sealing washer displaces into a peripheral recess in the union nut adjacent the reverse flange and seat so that a large amount of excess torquing may be accommodated. Also, it will be noted that if after tightening reverse torque is accidentally applied to the nipple, the material of the sealing washer will tend to assume its original shape and so the seal will be maintained. The reverse flare and seat, as well as the reverse slant of both faces of the sealing washer and the recess in the union nut, prevent the tendency for excess torquing to displace the material of the sealing washer into the through bore of the coupling. The reverse flare on the tubing provides the added effect of a considerable increase of strength of the joint, it being apparent that the amount of force required to pull the tubing out of the union nut would be extreme.

The novel features believed characteristic of this invention are set forth in the appended claims. The invention itself, however, as well as other objects and advantages thereof, will best be understood by reference to the following detailed description of a particular embodiment, when read in conjunction with the accompanying drawing, wherein:

Figure 1:
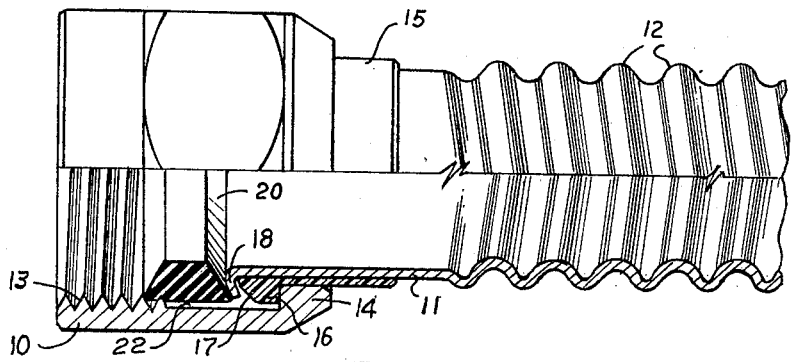
FIGURE 1 is an elevation view, partly in section, of a coupling assembly or union according to the invention, in place on an end of a length of tubing.
Figure 3:
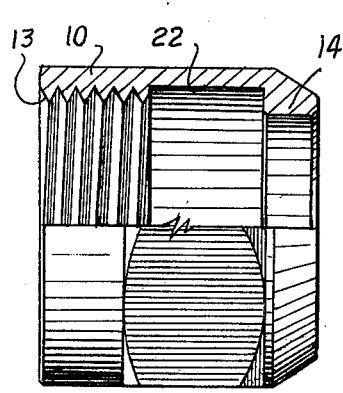
FIGURE 3 is a view, partly in section, of the union nut used in the assembly of FIGURES 1 and 2.
Figure 4:
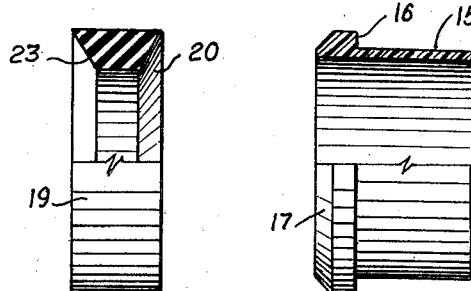
FIGURE 4 is a view, partly in section, of the sealing washer used in the assembly of FIGURES 1 and 2.
Figure 5:
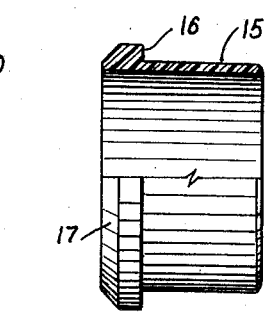
FIGURE 5 is a view, partly in section, of the insulating sleeve used in the assembly of FIGURES 1 and 2.

With reference now to FIGURE 1, there is seen a union nut 10 along with the associated parts making up the coupling according to this invention. This union is for the purpose of connecting an end of a length of copper tubing 11 or the like to a nipple or similar male fitting. The tubing 11 may include corrugations 12, or of course may be smooth. The union nut 10 which may be seen in an individual view in FIGURE 3, includes interior threads 13 to engage the nipple, and also includes a collar 14 having an inside diameter somewhat greater than the outside diameter than the tube 11. The exterior of the union nut 10 is hexagonaly shaped for engagement by a wrench in assembly. Interposed between the collar 14 of the union nut 10 and the walls of the tube 11 is an insulating sleeve 15 which is cylindrical and surrounds the tube. The form and shape of the sleeve 15 may best be seen in the individaul view of FIGURE 5. This sleeve 15 is composed of a fairly strong and hard, yet somewhat flexible material such as Zytel 121. The sleeve 15 includes a collar 16 which engages the collar 14 at a 90° opposing face. The outside diameter of the collar 16 must not exceed the minimum inside diameter of the screwthreads 13 since this part is fitted into the assembly from the left-hand end of the union nut 10 as seen in FIGURE 1. Also formed on the collar 16 of the sleeve 15 is a reverse 45° seat 17. Formed at the end of the tube 11 is a reverse flare 18 fitting over the seat 17, it being noted of course that the flare 18 ordinarily must be formed on the end of the tube 11 after the union nut 10 along with the sleeve 15 have been slipped over the end of the tube. Also, it will be noted that at its widest point the outside diameter of the flange 18 must not exceed the minimum inside diameter of the screwthreads 13 since the flange usually must be slipped down through the threaded portion of the union nut 10. As the final part of the female portion of the union nut, a seal washer 19 is utilized which has two 45° opposing faces. The seal washer 19 seen individually in FIGURE 4, is composed of an insulating material such as neoprene containing a silicon compound which is fairly firm but yet can be displaced when the nipple is torqued into the union nut. The material from which the seal washer 19 is composed will not compress appreciably. It is noted that the outside diameter of the seal washer 19 is slightly greater than the minimum inside diameter of the thread 13 so that after the tube 11 along with its flange 18 has been slipped into the interior of the union nut 10 the washer 19 can be forced into place as seen in FIGURE 1 and the assembly will be self supporting in this condition until used, none of the parts being free to be separated except with considerable force.

Figure 2:
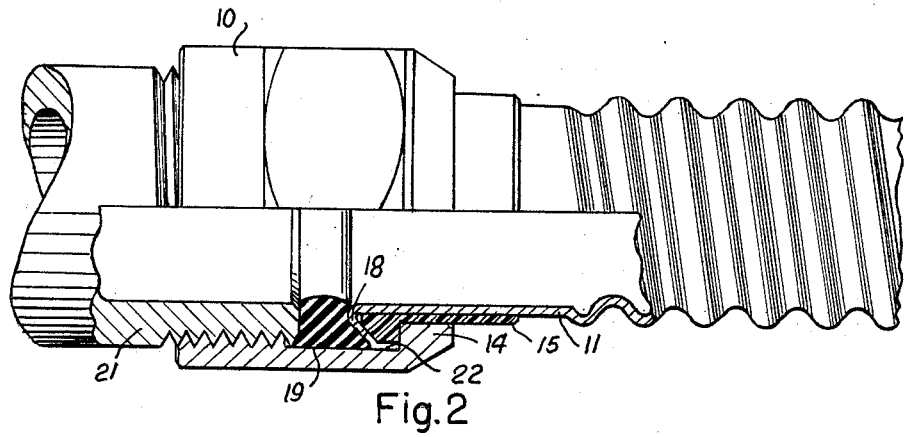
FIGURE 2 is a sectional view of the apparatus of FIGURE 1 in the operative condition with a nipple in place in the coupling.

Now it will be seen that the interior 45° face 20 of the sealing washer 19 seats against the reverse flange 18 of the tube 11, and so when a nipple 21 is torqued into the nut 10 as will be seen in FIGURE 2, the material of the washer 19 will tend to move outward in a radial direction into a recess area 22 of the union nut 10. If additional torque is applied to the nipple and nut, the material of the washer 19 displaces so as to fill any voids in the recess 22 and ultimately, because of its inability to compress, solidifies so as to provide a positive stop to excessive movement of the nipple 21. It is important to note that there is little, if any, tendency for the material of the washer 19, or other parts of the assembly, to displace inwardly into the through-bore of the coupling since the material is forced outward in a radial direction into the recess 22 by the shaping of the reverse flange 18 and its seat 17 along with the 45° face 20. This effect is aided by a reverse slanting face 23 on the sealing washer 19 on the side that it engages the nipple 21. Due to the considerable displacement possible of the material of the washer 19, it will be noted that a positive seal is produced over a wide range from minimum to maximum torquing. For example, an excellent seal is provided even though the nipple 21 and the union nut 10 are torqued together only hand-tight. This positive seal will still be present for continued torquing up to the point where the material of the washer 19 is displaced to entirely fill the recess 22. Further, because the material of the washer 19 does not compress but rather displaces, if for some reason the nipple 21 is backed off, i.e., reverse movement, so as to tend to loosen the joint, the material of the washer will tend to assume its original shape and will thus reseal the joint.

A connector constructed according to the preferred embodiment described above, at a size to acommodate a standard ¾ inch pipe nipple, has been repeatedly observed to withstand 200 p.s.i. water pressure with no leakage whatsoever even though the nipple was only applied "hand-tight" to the union. Also, in a test to illustrate the resealing feature, the nipple may be uscrewed slightly, from hand-tight until leakage of water will just bearly occur, and then the system allowed to set and it will be noted that within several seconds the leakage will stop and a pressure of at least 200 p.s.i. can be maintained without further leakage. For standard torquing on this connector, which may be assumed to be about 450 inch-pounds, no leakage occurs at pressures up to 1,000 p.s.i. and in tests of "hammering" pressures it will be noted that after application of cycling pressures of 0–500 p.s.i. for a period of 15 minutes at one cycle per 2 seconds no leakage is noted, and after this the pressure may be increased to 1,000 p.s.i. with no leakage.

When the union nut 10 is constructed of ordinarily brass bar stock, excess torquing on the connector will destroy the hex wrench pads before destroying the internal seal.

What is claimed is:
1. A connector assembly for fluid conduits comprising:
   (a) a conduit having a rearwardly inclined radial flange applied to one end thereof;
   (b) a union nut having a cylindrical bore and at one end a collar of reduced diameter through which said conduit extends;
   (c) a seat provided around the inside face of the collar to engage one face of said rearwardly inclined, radial flange;
   (d) the end of the union opposite the collar having interior threads to engage a male fitting; and
   (e) an annular sealing washer of deformable material positioned within the union in a peripheral recess between the interior threads and the collar;
   (f) said sealing washer having opposed beveled faces providing a minimum axial dimension at the inner diameter thereof;
   (g) one of said washer faces being disposed for mating engagement with the opposite face of said conduit flange; and the other of said washer faces being disposed for engagement by a male fitting threaded into the union;
   (h) and a male fitting threaded into said union, having an end face normal to the longitudinal axis of the connector assembly for engaging said other face of said washer whereby said washer is displaced into said recess upon the tightening of the fitting.

2. A connector assembly according to claim 1 wherein a sleeve is provided for fitting around said end of the conduit with the sleeve being interposed between the collar of the union and the flange of the conduit.

3. A connector assembly according to claim 2 wherein said reverse seat is provided on an enlarged end of said sleeve which fits against the inside radial face of said collar of the union.

4. A connector assembly according to claim 3 wherein said sleeve is composed of insulating material.

5. A connector assembly according to claim 1 wherein the sealing washer is composed of a non-compressable material which may be displaced into said recess.

References Cited
UNITED STATES PATENTS

| | | | |
|---|---|---|---|
| 448,717 | 4/1891 | Hogan | 285—334.5 X |
| 1,662,954 | 3/1928 | Broido | 285—334.5 X |
| 1,880,638 | 10/1932 | Wood et al. | 285—334.5 |
| 2,950,928 | 8/1960 | Bowan | 285—354 X |
| 3,047,937 | 8/1962 | Vecchi | 285—55 X |
| 3,346,274 | 10/1967 | Baron | 285—52 |
| 2,487,241 | 11/1949 | Hilton | 285—334.3 X |

FOREIGN PATENTS 1,047,939  7/1953  France.

DAVID J. WILLIAMOWSKI, Primary Examiner

D. W. AROLA, Assistant Examiner

U.S. Cl. X.R.

285—334.4, 334.5